3,404,449
HEAVY WALLED PIPE MANUFACTURE
William A. Horning, Hubbard, Ohio, assignor to Sharon Tube Company, Sharon, Pa., a corporation of Pennsylvania
Filed July 19, 1965, Ser. No. 472,799
4 Claims. (Cl. 29—474.3)

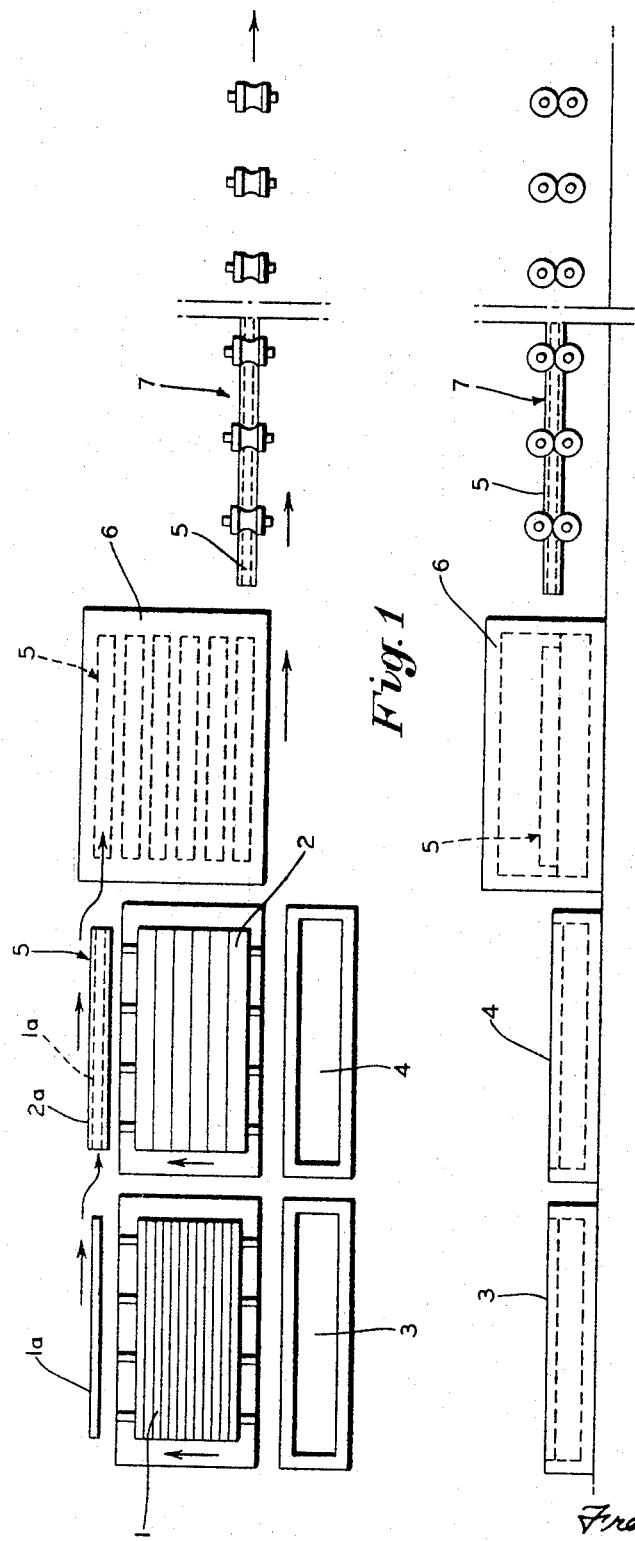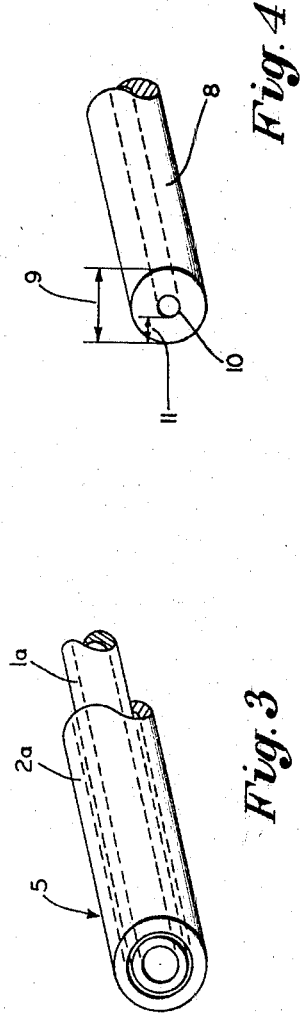

ABSTRACT OF THE DISCLOSURE

A method of making heavy walled steel pipe by hot buttweld pipe manufacturing procedure in the range of nominal ⅛" to 1" pipe sizes. The method comprises the steps of selecting lengths of pipe in nominal sizes next smaller and next larger than the nominal size of the heavy walled pipe to be produced, respectively, for inner and outer components; fluxing the components; telescoping an inner component within an outer component; heating the pair of pipe components to skelp forge-welding temperature; reducing rolling the pair on stands of a buttweld pipe mill sized to form and buttweld a nominal pipe size intermediate the nominal sizes of the inner and outer components; reducing the exterior diameter during rolling, buttweld-like welding the adjacent surfaces of the inner and outer components, reducing the inner diameter of the inner component, and forming in the heavy walled small diameter pipe produced a wall thickness greater than the combined wall thickness of the components prior to rolling.

---

The invention relates to the manufacture of heavy walled pipe and more particularly to the manufacture of small diameter heavy walled pipe or tubing.

Large quantities of pipe or tubing, particularly in the smaller nominal ⅛", ¼", ⅜", ½", ¾", and 1" pipe sizes, are made from skelp by heating and buttwelding procedures. Such pipe produced by hot welding procedures in the smallest diameters may be made with two different wall thicknesses. As the nominal size increases, pipe with three different wall thicknesses may be produced by hot welding procedures. For example, standard nominal ⅛" size buttweld pipe may have a wall thickness of 0.068" while extra strong nominal ⅛" size pipe has a wall thickness of 0.095". The pipe wall thickness is dependent upon the thickness of the skelp used in the pipe manufacture, and upon the design and arrangement of rolls in the hot pipe mill.

Heretofore when small diameter heavy walled pipe has been desired or required with a wall thickness heavier than could be produced directly as electric welded or hot buttwelded pipe, it has been necessary first to make seamless tubing by usual seamless tube manufacturing procedures with a substantially larger diameter such as not less than 1½" O.D. as the tube comes off the seamless tube mill. This seamless tube then must be reduced by hot reducing procedures or it may be cold drawn, or both, in order to produce small diameter heavy walled pipe in nominal ⅛" to 1" pipe sizes.

Alternately, heavy pipe or tube has had to be made from solid bars. Either of these prior procedures for the manufacture of heavy walled small diameter pipe has been very expensive, and there has long existed an unsatisfied need for inexpensive heavy walled small diameter pipe products and for procedure for the manufacture thereof inexpensively.

I have discovered a solution to these problems and a procedure satisfying the need for the inexpensive manufacture of heavy walled small diameter pipe products which involves telescoping one within another inner and outer pipe components with the inner component having an outer diameter approximating the inner diameter of the outer component, and with the inner and outer components preferably comprising pipe produced continuously from skelp by hot welding procedures; then heating the telescoped pipe components to welding temperature; and then reducing the heated telescoped pipe components in a continuous hot buttweld pipe rolling mill similar to that on which the constituent pipe components were produced, to hot weld bond the inner and outer pipe components together to form a homogeneous pipe wall in small diameter heavy walled pipe, having an outer diameter less than the outer diameter of the outer telescoped pipe component, and having a wall thickness preferably greater than the combined wall thicknesses of the telescoped inner and outer components.

Accordingly, it is a general object of the present invention to provide new procedures for the inexpensive manufacture of heavy walled small diameter pipe in the range for example of nominal ⅛" to 1" pipe sizes.

Furthermore, it is an object of the present invention to provide new procedures for the manufacture of heavy walled small diameter pipe eliminating the necessity of utilizing expensive seamless tube and cold drawing procedures.

Furthermore, it is an object of the present invention to provide new procedures for the manufacture of heavy walled small diameter steel pipe utilizing typical hot buttweld pipe manufacturing equipment.

Also, it is an object of the present invention to provide new procedures for the manufacture of heavy walled small diameter pipe in which the wall thickness of the heavy pipe wall may be controlled within limits to produce heavy walled pipe products having a desired pipe wall thickness.

Moreover, it is an object of the present invention to provide a new procedure for the manufacture of heavy walled small diameter pipe which may be used as mechanical tubing as a raw or feed material for screw machine products.

Finally, it is an object of the present invention to provide new hot welding pipe manufacturing procedures for producing small diameter heavy walled pipe eliminating difficulties heretofore encountered in the art; eliminating complicated and costly seamless tube and cold drawing procedures; achieving the indicated objects in a combined, simple, effective, and inexpensive manner; and solving problems and satisfying needs existing in the art.

These and other objects and advantages apparent to those skilled in the art from the following description and claims, may be obtained, the stated results achieved, and the described difficulties overcome, by the methods, steps, procedures, treatments, and discoveries which comprise the present invention, the nature of which is set forth in the following general statement, a preferred embodiment of which—illustrative of the best mode in which applicant has contemplated applying the principles—is set forth in the following description and shown in the drawing, and which are particularly and distinctly pointed out and set forth in the appended claims forming part hereof.

The nature of the discoveries of the present invention may be stated in general terms as including in a method of manufacturing heavy walled small diameter steel pipe by continuous hot buttweld pipe manufacturing procedures, the steps of providing a plurality of pipe components of available usual nominal sizes, preferably continuous hot buttweld pipe made from skelp; preferably pickling, rinsing, and fluxing the pipe components; telescoping an inner pipe component having a smaller nominal pipe size within an outer pipe component having a larger nominal pipe size than the nominal size of the heavy walled small diameter steel pipe to be made, and with the inner component having an outer diameter approximately the same or smaller than the inner diameter of the outer component, to form a telescoped pair of components; heating the telescoped pair of components to above welding temperature (2580° F. to 2640° F.); and then passing the heated pair through a buttweld pipe mill to substantially reduce the external diameter of the pair, to weld the adjacent surfaces of the inner and outer components of the pair, and to reduce the inner diameter of the inner component of the pair and form a heavy walled small diameter pipe of nominal pipe size intermediate the nominal pipe sizes of the components.

By way of example, the improved procedure for the manufacture of heavy walled small diameter pipe is illustrated in the accompanying drawing forming part hereof, in which:

FIGURE 1 is a diagrammatic plan view of the layout of hot buttweld pipe manufacturing equipment which may be used in carrying out the new procedure;

FIG. 2 is a diagrammatic side elevation of the equipment shown in FIG. 1;

FIG. 3 is a fragmentary perspective view of a pair of inner and outer telescoped pipe components before heating in the furnace shown in FIGS. 1 and 2; and FIG. 4 is a view similar to FIG. 3 but showing the small diameter heavy walled pipe produced from the components illustrated in FIG. 3 on the hot buttweld pipe manufacturing equipment shown in FIGS. 1 and 2.

Similar numerals refer to similar parts throughout the various figures of the drawing.

Patent No. 2,792,206 illustrates a typical mill for the continuous manufacture of buttweld pipe from skelp in the smaller sizes such as nominal ⅛″ to 1″ pipe size. Standard and Extra Strong pipe in the indicated pipe sizes may be made on such a mill having the dimensional characteristics indicated in Tables I and II below.

TABLE I.—STANDARD PIPE

| Nominal Size, in. | Actual O.D., in. | Actual I.D., in. | Wall Thickness, in. |
|---|---|---|---|
| ⅛ | 0.405 | 0.269 | 0.068 |
| ¼ | 0.540 | 0.364 | 0.088 |
| ⅜ | 0.675 | 0.493 | 0.091 |
| ½ | 0.840 | 0.622 | 0.109 |
| ¾ | 1.050 | 0.824 | 0.113 |
| 1 | 1.315 | 1.049 | 0.133 |

TABLE II.—EXTRA STRONG PIPE

| Nominal Size, in. | Actual O.D., in. | Actual I.D., in. | Wall Thickness, in. |
|---|---|---|---|
| ⅛ | 0.405 | 0.215 | 0.095 |
| ¼ | 0.540 | 0.302 | 0.119 |
| ⅜ | 0.675 | 0.423 | 0.126 |
| ½ | 0.840 | 0.546 | 0.147 |
| ¾ | 1.050 | 0.742 | 0.154 |
| 1 | 1.315 | 0.957 | 0.179 |

Normally the same roll passes for any particular pipe size may be used for making either the Standard or Extra Strong pipe, a different skelp thickness being used to obtain the increased wall thickness for the Extra Strong pipe.

Another strength of pipe is known in the art as Double Extra Strong pipe whose dimensional characteristics are indicated in Table III below. Nominal ½″ pipe size is the smallest Double Extra Strong pipe made or available. Further, the wall thicknesses of the ½″, ¾″, and 1″ pipe sizes in Table III approach the maximum wall thickness that can be made on mills capable of producing Double Extra Strong pipe. Such mills essentially are mills designed for the manufacture of larger pipe sizes and to make Double Extra Strong pipe must have considerably greater strength, a greater number of roll stands, and other special design features not present in mills such as shown in Patent No. 2,792,206, the latter of which are capable of producing continuous buttweld pipe from skelp both Standard and Extra Strong in the nominal ⅛″ to 1″ pipe sizes but which cannot produce Double Extra Strong pipe.

TABLE III.—DOUBLE EXTRA STRONG PIPE

| Nominal Size, in. | Actual O.D., in. | Actual I.D., in. | Wall Thickness, in. |
|---|---|---|---|
| ½ | 0.840 | 0.252 | 0.294 |
| ¾ | 1.050 | 0.434 | 0.308 |
| 1 | 1.315 | 0.599 | 0.358 |

Further significant is the fact that Double Extra Strong pipe in the nominal ⅛″, ¼″, and ⅜″ pipe sizes is not known in the art. Furthermore, in addition to the wall thickness limitation of available Double Extra Strong buttweld pipe made from skelp as indicated in Table III, although such pipe may be useful for normal pipe applications, the notch effect in the pipe wall resulting from the heavy skelp which must be formed and buttwelded in the manufacture of Double Extra Strong pipe directly from skelp prevents such pipe from being used for many mechanical tubing applications, for instance, as the raw material for the manufacture of screw machine parts, or for the manufacture of such products as spark plugs.

In accordance with the invention, in making any particular nominal pipe size of heavy walled small diameter pipe, two pipe components of available sizes are telescoped one within the other with the inner component having an outer diameter approximately the same as or smaller than the inner diameter of the outer component. These inner and outer pipe components if necessary first are pickled and rinsed. They then are fluxed before telescoping the inner and outer components one within the other to form a telescoped pair. The pipe components preferably are continuous hot buttweld pipe made from skelp. However, if desired electric-welded pipe having the typical pipe characteristics set forth in Table I or II may be used where desired.

A supply of lengths of pipe 1 which may form the inner component 1a of a telescoped pair is shown in FIG. 1, and a similar supply of pipe 2 used to form the outer component 2a is also shown. Pipes 1 and 2 may previously have been fluxed in flux pots 3 or 4 before telescoping a length 1a of inner component pipe 1 within a length 2a of outer component pipe 2. The telescoped pair of inner and outer components is indicated generally at 5 in FIGS. 1 and 3. Successive pairs of telescoped pipes 5 then are introduced into a heating furnace 6 performing the same function as the skelp heating furnace in typical buttweld pipe manufacturing equipment.

The pairs 5 of telescoped components are heated to above welding temperature (2580° F. to 2640° F.) in furnace 6. After heating for a sufficient or required length of time, the heated pairs 5 of telescoped pipe are fed one after another to a typical pipe mill indicated generally by the stands of rolls 7 in FIGS. 1 and 2. The same rolls and roll stands used in making Standard or Extra Strong nominal pipe size of any one size may be used to roll the heavy walled pipe of the same nominal size in accordance with the invention.

During rolling on the typical pipe mill 7, the telescoped steel pipe components 5 are welded and bonded together throughout the contiguous or adjacent surfaces of the two telescoped components and pipe 8 with a homogeneous steel wall is formed. In effect, a weld is established having the characteristics of a buttweld between the contiguous outer and inner circumferential surfaces, respectively, of the inner and outer pipe components 1a and 2a of any pair 5.

During the reduction and welding or bonding of the telescoped pipe components 1a and 2a in passing through the pipe mill stands 7, the outer diameter of the outer component is substantially reduced in forming the finished pipe 8 (FIG. 4) with an outer diameter 9; the inner diameter of the inner component is substantially reduced as indicated at 10; and the desired wall thickness of the heavy wall is obtained, preferably a thickness 11 in excess of the combined thickness of the components 1a and 2a in FIG. 3.

In the case of heavy walled small diameter pipe made in accordance with the invention in sizes smaller than the nominal ½" pipe size, products are provided that heretofore have not been known.

In the case of nominal ½" and larger pipe sizes formed with heavy walls in accordance with the present invention, the wall thickness of the heavy walled products may be greater than the maximum wall thickness that can be provided in Double Extra Strong pipe made in accordance with prior practice. Furthermore, the heavy walled product may be made on pipe mills not capable of producing Double Extra Strong pipe in the same pipe sizes.

Several examples of the manufacture of small diameter heavy walled pipe in accordance with the invention are given below in Examples A, B, and C.

Example A

In making a nominal ¼" heavy walled pipe in accordance with the invention, a length of nominal ⅛" Standard pipe was telescoped into a similar length of ⅜" Standard pipe. The inner ⅛" component such as 1a in FIG. 3 had a 0.405" O.D. which telescoped with clearance, as shown (FIG. 3), within the 0.493" I.D. of the outer ⅜" pipe component, such as 2a in FIG. 3. Previous to being telescoped both components were pickled, rinsed and then dipped into borax for fluxing. Other desired flux materials, however, such as phosphate coatings may be used.

The pair of telescoped inner and outer pipe components then were placed in a furnace such as furnace 6 and heated up to 2580° F. to 2640° F. and then entered and passed through the stands of a buttweld pipe mill normally used for forming and rolling nominal ¼" pipe size producing the improved heavy walled ¼" pipe.

The finished heavy walled pipe, typically illustrated at 8 in FIG. 4, had an outside diameter 9 of 0.540" which is the outside diameter of nominal ¼" pipe size. The inner diameter 10, however, of the heavy walled pipe produced was only 0.172". This provided a pipe wall thickness 11 of 0.184". The finished wall thickness 11 of the heavy walled ¼" pipe of 0.184" is 0.025" thicker than the combined thickness (0.159") of the inner ⅛" component (0.068") and the outer ⅜" component (0.091") from which the heavy walled ¼" pipe was formed. Also, the inner diameter 10 of the ¼" heavy walled pipe 8 is substantially smaller (0.172") than the inner diameter (0.269") of the inner ⅛" pipe component 1a from which pipe 8 in part was formed and substantially smaller than the inner diameter (0.302") of ¼" Extra Strong pipe (Table II).

Example B

A nominal ½" heavy walled pipe was made in accordance with the invention using a length of nominal ⅜" Standard pipe as the inner pipe component 1a of a pair 5 telescoped into similar length of nominal ¾" Extra Strong pipe forming the outer component 2a of the pair 5. The inner ⅜" component had a 0.675" O.D. which telescoped with clearance, again as typically shown in FIG. 3 within the 0.742" I.D. of the outer ¾" Extra Strong pipe component 2a.

The slight clearance between the telescoped components facilitates heating of and welding between the adjacent surfaces of the components during the subsequent heating and rolling steps. Both components were pickled, rinsed, and then dipped into borax for fluxing before being telescoped.

The telescoped pair of inner and outer pipe components then were placed in a furnace such as furnace 6 and heated up to 2580° F. to 2640° F. and then passed through the stands of a buttweld pipe mill normally used for rolling nominal ½" pipe size producing the improved heavy walled ½" pipe.

The finished heavy walled pipe, typically illustrated at 8 in FIG. 4, had an outside diameter 9 of 0.840" which is the outside diameter of nominal ½" pipe size. The inner diameter 10, however, of the heavy walled pipe produced was only 0.375". This provided a pipe wall thickness 11 of 0.233". This 0.233" wall thickness of the heavy walled ½" pipe is 0.012" less than the combined thickness (0.245") of the inner ⅜" component (0.091") and the outer ¾" component (0.154") from which the heavy walled ½" pipe was formed. The inner diameter 10 of the ½" heavy walled pipe 8 (0.375") is substantially smaller than the inner diameter (0.493") of the inner ⅜" pipe component 1a from which pipe 8 in part was formed and substantially smaller than the inner diameter (0.546") of ½" Extra Strong pipe (Table II).

The particular mill on which the heavy walled small diameter steel pipe of nominal ½" pipe size of Example B was made had certain unusual features of roll stand and roll pass design. Actually, the mill had been redesigned so as to use the same skelp size or width (for reasons of economy) to make both ½" and ¾" nominal pipe size. The mill had ten roll stands to accomplish the buttwelding reduction and sizing. Since both pipe sizes are made from the same width skelp, the ½" pipe must be stretched or elongated by roll pass design to a much greater extent than the ¾" pipe size made from the same width skelp.

This inherent design feature of the mill on which the Example B heavy walled ½" pipe was rolled caused the heavy walled pipe to be stretched or elongated because of its ½" size, to a much greater extent than normally would be the case in usual roll passes and stands designed for the production of ½" pipe with normal skelp width. In the particular instance, this resulted in reducing the wall thickness of the ½" heavy walled pipe 8 such that as indicated, the resultant wall thickness was 0.233". This thickness is 0.012" less than the combined wall thickness (0.245") of the inner and outer pipe components from which the heavy walled pipe was made.

Since this particular relationship is due to the particular roll design of the ½" continuous pipe mill roll stands available and used, it is to be understood that where a ½" buttweld pipe mill is used with roll stands and passes designed for using a normal width of starting skelp (not the skelp width also to be used for ¾" pipe), the wall thickness of heavy walled pipe produced would be considerably thicker than the 0.233" thickness indicated, and thicker than the combined thickness of the inner and outer pipe components used.

Further, other measures may be taken in accordance with the invention as described below to control the resulting thickness of the heavy walled small diameter pipe produced.

A nominal ¾" pipe size heavy walled small diameter pipe was made in accordance with the invention using a length of nominal ½" Standard pipe as an inner component telescoped into a similar length of 1" Extra Strong pipe as the outer component of a pair. The inner ½" component had a 0.840" O.D. which telescoped with clearance, again as shown in FIG. 3, within the 0.957" I.D. of the outer 1" Extra Strong pipe component. Both components were pickled, rinsed and then dipped into borax for fluxing before being telescoped to form the pair.

The pair of telescoped inner and outer pipe components then were placed in a furnace such as furnace 6 and heated to normal forge-welding temperature, that is up to 2580° F. to 2640° F., which is the normal welding temperature for low carbon steel used as skelp in the manufacture of buttweld pipe. The heated pair of pipe components then was passed through the stands of a buttweld pipe mill normally used for rolling nominal ¾" pipe size producing the improved heavy walled ¾" pipe.

The finished heavy walled pipe, again as typically illustrated in FIG. 8, had an outside diameter 9 of 1.050"

which is the outside diameter of nominal ¾" pipe size. The inner diameter 10, however, of the heavy walled pipe produced was only 0.4375". This provided a pipe wall thickness 11 of 0.307". The 0.307" thickness of the heavy walled ¾" pipe is 0.019" thicker than the combined thickness (0.288") of the inner ½" component (0.109") and the outer 1" component (Extra Strong— 0.179") from which the heavy walled ¾" pipe was formed.

Also, the inner diameter 10 of the ¾" heavy walled pipe 8 (0.4375") is substantially smaller than the inner diameter (0.622") of the ½" pipe inner component 1a from which the pipe 8 in part was formed, and substantially smaller than the inner diameter (0.742") of ¾" Extra Strong pipe (Table II), and also substantially the same as the inner diameter (0.434") of Double Extra Strong ¾" pipe (Table III).

Thus, Example C illustrates that heavy walled small diameter pipe may be made having the same wall thickness and inner and outer diameters as Double Extra Strong pipe without requiring the special mills, special skelp sizes, etc. heretofore required for the manufacture of Double Extra Strong pipe.

The special combination of dimensional characteristics present in heavy walled small diameter pipe produced in accordance with the invention as indicated in Examples A, B, and C are tabulated in Table IV below. Similarly, the dimensional characteristics of the pipe components from which the heavy walled small diameter pipe of Examples A, B, and C were made are tabulated in Table V below.

TABLE IV.—HEAVY WALLED SMALL DIAMETER PIPE

| Example | Nominal Size, in. | Actual O.D., in. | Actual I.D., in. | Wall Thickness, in. |
| --- | --- | --- | --- | --- |
| A | ¼ | 0.540 | 0.172 | 0.184 |
| B | ½ | 0.840 | 0.375 | 0.233 |
| C | ¾ | 1.050 | 0.4375 | 0.307 |

TABLE V.—PIPE COMPONENTS FROM WHICH EXAMPLES A, B, AND C HEAVY WALLED SMALL DIAMETER PIPE WERE MADE

| Example | Component Nominal Size, in. | Component Wall Thickness, in. | Components Combined Thickness, in. | Heavy Walled Pipe Thickness (From Table IV), in. |
| --- | --- | --- | --- | --- |
| A | ¼ (Inner) ⅜ (Outer) | 0.068 0.091 | 0.159 | 0.184 |
| B | ⅜ (Inner) ¾ (Outer)* | 0.091 0.154 | 0.245 | 0.233 |
| C | ½ (Inner) 1 (Outer)* | 0.109 0.179 | 0.288 | 0.307 |

* Extra strong.

In the operation of a typical mill for the continuous manufacture of buttweld pipe from skelp in the smaller sizes, it is possible by varying the relative speed of rolls at two adjacent stands, such, for instance, as between stands 6 and 7 in a 10-stand mill, to change the thickness of the pipe produced (which is a function of the skelp thickness) up to about a 9% increase or decrease. By the variable speed control indicated, used to establish crowding between stands as by slowing down stand 7 with relation to stand 6, an increase of about 9% in thickness of the pipe wall over the skelp thickness may be obtained. On the other hand, if stand 7 is speeded up with relation to stand 6 to establish stretching between the stands, the pipe wall may be thinned by about 9% with respect to the skelp thickness.

In this manner, for example, with 0.100" thick skelp, the resulting pipe produced may have a 0.091" wall thickness (by stretching between stands) or may be thickened to a 0.110" pipe wall thickness (by crowding between stands). These same procedures or controls—varying the speed between rolls between stands—can be exercised in producing heavy walled pipe in accordance with the procedures of the invention so as to thicken or thin within practical limits the thickness of the wall of the final heavy walled product produced.

Thus, the wall thickness of the heavy walled pipe of Examples A, B, and C in Table IV may be varied when desired to change the thickness either way up to about 9%. This is a very important aspect of the present invention since a wide range of thicknesses and of inner and outer diameter relationships and sizes may be produced to serve a wide field of use of mechanical tubing.

It is noted that in each of Examples A, B, and C, the nominal heavy walled pipe size produced was produced from a telescoped pair of inner and outer components which are, respectively, the next smaller and the next larger nominal pipe size as related to the resultant product. This relationship may be maintained in accordance with the invention to produce other nominal heavy walled small diameter pipe sizes than indicated by Examples A, B, and C. For example, heavy walled nominal ⅜" pipe may be produced using a nominal ¼" inner component and a nominal ½" outer component; and in a similar manner heavy walled nominal 1" pipe may be made from an inner ¾" pipe component and a 1¼" Extra Strong pipe outer component.

The procedure of the present invention is a fundamental departure from anything known in the buttweld pipe art. Furthermore, it is a complete departure from prior procedures in unrelated arts wherein bi-metallic tubes have been produced or bonded by interposing a bonding or brazing material between the different metals. Where diameter reduction has been involved in the prior processing of starting materials, the wall thickness has been reduced or thinned by drawing operations or by the use of an internal mandrel.

Thus, the present invention is characterized by actually accomplishing buttwelding between the outer surface of the inner component and the inner surface of the outer component to achieve the same characteristics obtained in the manufacture of buttweld pipe from skelp and avoiding the use or control of any special bonding material. Furthermore, the procedure is characterized by the hot working and thickening of the metal wall of the resultant pipe along with substantially reducing the inner and outer diameters of the pipe. This produces the homogeneous heavy pipe wall even though formed from separate inner and outer components.

Another aspect of the invention is the fact that the new procedure involves the use of products produced from skelp as a raw material, involves the use of typical standardized types of such pipe products as a raw material, and involves the use of existing simple, continuous buttweld pipe mills to manufacture heavy walled small diameter pipe in accordance with the invention. These considerations reduce the cost of the heavy walled small diameter pipe produced to but a small fraction of the cost of making pipe structures having the dimensional characteristics and relationships indicated by any known prior procedure.

Accordingly, the present invention provides new procedures for the inexpensive manufacture of heavy walled small diameter pipe in the range, for example, of nominal ⅛" to 1" pipe sizes; eliminates the necessity of utilizing expensive procedures and equipment for the manufacture of such heavy walled small diameter pipe; provides for producing heavy walled pipe with wall thicknesses which may be controlled within limits to provide any desired pipe wall thickness; provides for the manufacture of pipe which may be used as mechanical tubing for many industrial applications; and provides a solution to problems and satisfies needs long existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and of the new pipe manufacturing procedures are by way of example and the scope of the invention is not limited to the exact sizes described because various products may be produced by the same procedure without departing from the fundamental principles of the invention.

Having now described the features, discoveries and principles of the invention, the preferred procedures used, and the advantageous, new and useful results obtained thereby; the new and useful discoveries, principles, methods, steps, procedures, treatments, and relationships, and mechanical equivalents obvious to those skilled in the art are set forth in the appended claims.

I claim:
1. The method of making heavy walled small diameter steel pipe by hot buttweld pipe manufacturing procedures in the range of nominal 1/8" to 1" pipe sizes which includes the steps of providing a plurality of buttweld skelp-formed pipe components in the range of nominal 1/8" to 1" standard pipe sizes, in the range of nominal 1/8" to 1" extra strong pipe sizes and in the range of nominal 1/2" to 1" double extra strong pipe sizes; selecting lengths of pipe in nominal sizes next smaller and next larger than the nominal size of the heavy walled pipe to be produced, respectively, for inner and outer components; fluxing the pipe components; telescoping an inner pipe component within an outer pipe component to form a pair; heating the pair to skelp forge-welding temperature; reducing rolling the pair on the stands of a buttweld pipe mill sized to form and buttweld a nominal pipe size intermediate the nominal sizes of the inner and outer components; and reducing during said rolling the external diameter of the pair, buttweld-like welding the adjacent telescoped surfaces of the inner and outer components of the pair, reducing the inner diameter of the inner component of the pair, and forming in the heavy walled small diameter pipe produced a wall thickness greater than the combined wall thickness of the components of the pair prior to rolling.

2. The method set forth in claim 1 in which the inner component has an outer diameter smaller than the inner diameter of the outer component providing slight clearance between the telescoped components to facilitate heating of and welding between adjacent surfaces of the components.

3. The method set forth in claim 1 in which the pair of telescoped components is heated to between 2580° F. and 2640° F.

4. The method set forth in claim 1 in which the wall thickness of the heavy walled pipe produced is from 0.019" to 0.025" thicker than the combined wall thickness of the components of the pair prior to rolling.

References Cited

UNITED STATES PATENTS

| | | | |
|---|---|---|---|
| 798,056 | 8/1905 | Nicholson | 138—142 |
| 831,887 | 9/1906 | Nicholson | 29—474.3 X |
| 2,032,685 | 3/1936 | Coe | 29—474.3 |
| 2,104,884 | 1/1938 | Quarnstrom | 138—142 |
| 2,792,206 | 5/1957 | Wagner | 263—3 |
| 3,075,484 | 1/1963 | Benteler | 228—17 X |
| 3,262,624 | 7/1966 | Benteler et al. | 228—17 |

JOHN F. CAMPBELL, *Primary Examiner.*

J. L. CLINE, *Assistant Examiner.*